US012761508B2

(12) United States Patent
Kuo et al.

(10) Patent No.: US 12,761,508 B2
(45) Date of Patent: Oct. 13, 2026

(54) DISPLAY DEVICE

(71) Applicant: Innolux Corporation, Miaoli County (TW)

(72) Inventors: Yu-Tong Kuo, Miaoli County (TW); Jyun-Sian Li, Miaoli County (TW); Hong-Sheng Hsieh, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/912,623

(22) Filed: Oct. 11, 2024

(65) Prior Publication Data

US 2025/0155740 A1 May 15, 2025

(30) Foreign Application Priority Data

Nov. 9, 2023 (CN) ........................ 202311488950.9

(51) Int. Cl.

| | |
|---|---|
| ***G02F 1/13*** | (2006.01) |
| ***G02F 1/1335*** | (2006.01) |
| ***G02F 1/13357*** | (2006.01) |
| ***G02F 1/1343*** | (2006.01) |

(52) U.S. Cl.

CPC ...... *G02F 1/1323* (2013.01); *G02F 1/133531* (2021.01); *G02F 1/134309* (2013.01); *G02F 1/13439* (2013.01); *G02F 1/133611* (2013.01)

(58) Field of Classification Search

CPC ............ G02F 1/1323; G02F 1/133531; G02F 1/134309; G02F 1/13439

See application file for complete search history.

(56) References Cited

U.S. PATENT DOCUMENTS 11,650,442 B1 5/2023 Jitsui

FOREIGN PATENT DOCUMENTS

CN 102944950 A * 2/2013 ......... H10K 59/8791

* cited by examiner

*Primary Examiner* — Lucy P Chien

(74) *Attorney, Agent, or Firm* — JCIPRNET

(57) ABSTRACT

A display device, including a backlight, a display panel, a viewing angle control panel, and first to third polarizing units, is provided. The display panel is configured to convert an illumination light from the backlight into a display light. The viewing angle control panel is configured to control a light emission angle of the display device. The first polarizing unit is disposed between the backlight and the display panel and has a first absorption axis. The second polarizing unit is disposed between the display panel and the viewing angle control panel and has a second absorption axis. The third polarizing unit is disposed on the viewing angle control panel and has a third absorption axis. The third absorption axis is perpendicular to the first absorption axis and the second absorption axis, and the first absorption axis and the second absorption axis are perpendicular to each other on a same plane.

14 Claims, 7 Drawing Sheets

DISPLAY DEVICE

CROSS-REFERENCE TO RELATED APPLICATION

This application claims the priority benefit of China application serial no. 202311488950.9, filed on Nov. 9, 2023. The entirety of the above-mentioned patent application is hereby incorporated by reference herein and made a part of this specification.

BACKGROUND

Technical Field

The disclosure relates to an electronic device, and in particular to a display device.

Description of Related Art

The current display device has issues such as light leakage and color cast at a large viewing angle in a privacy mode.

SUMMARY

The disclosure provides a display device, which helps to improve issues such as light leakage or color cast at a large viewing angle.

In an embodiment of the disclosure, a display device includes a backlight, a display panel, a viewing angle control panel, a first polarizing unit, a second polarizing unit, and a third polarizing unit. The backlight is configured to provide an illumination light. The display panel is disposed on a transmission path of the illumination light to convert the illumination light into a display light. The viewing angle control panel is configured to control a light emission angle of the display device. The first polarizing unit is disposed between the backlight and the display panel and has a first absorption axis. The second polarizing unit is disposed between the display panel and the viewing angle control panel and has a second absorption axis. The third polarizing unit is disposed on the viewing angle control panel and has a third absorption axis. The third absorption axis is perpendicular to the first absorption axis and the second absorption axis, and the first absorption axis and the second absorption axis are perpendicular to each other on a same plane.

In another embodiment of the disclosure, the display device includes a backlight, a display panel, a viewing angle control panel, a first polarizing unit, a second polarizing unit, and a third polarizing unit. The backlight is configured to provide an illumination light. The display panel is disposed on a transmission path of the illumination light to convert the illumination light into a display light. The viewing angle control panel is configured to control a light emission angle of the display device. The first polarizing unit is disposed between the backlight and the display panel and has a first absorption axis. The second polarizing unit is disposed between the display panel and the viewing angle control panel and has a second absorption axis. The third polarizing unit is disposed on the display panel and has a third absorption axis. The third absorption axis and the second absorption axis are perpendicular to each other on a same plane, and the first absorption axis is perpendicular to the second absorption axis and the third absorption axis.

In yet another embodiment of the disclosure, the display device includes a backlight, a display panel, a viewing angle control panel, a first polarizing unit, a second polarizing unit, and a third polarizing unit. The backlight is configured to provide an illumination light. The display panel is disposed on a transmission path of the illumination light to convert the illumination light into a display light. The viewing angle control panel is configured to control a light emission angle of the display device. The first polarizing unit is disposed between the backlight and the viewing angle control panel and has a first absorption axis. The second polarizing unit is disposed between the display panel and the viewing angle control panel and has a second absorption axis. The third polarizing unit is disposed on the display panel and has a third absorption axis. The third absorption axis and the second absorption axis are perpendicular to each other on a same plane, and the first absorption axis is parallel to the second absorption axis.

In order for the features and advantages of the disclosure to be more comprehensible, the following specific embodiments are described in detail in conjunction with the drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
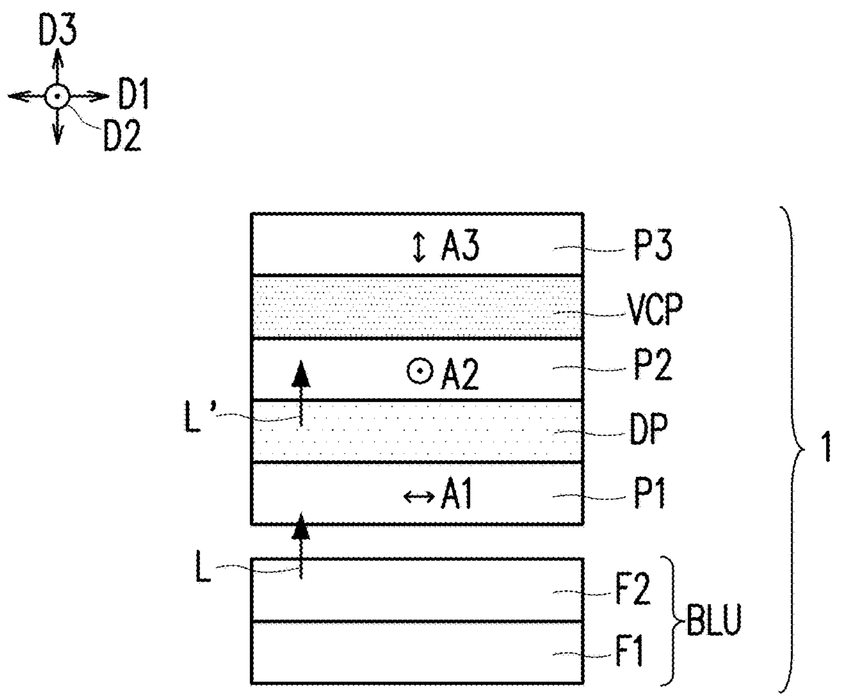
FIG. 1 to FIG. 3 are respectively partial cross-sectional schematic views of various display devices according to some embodiments of the disclosure.

Reference will now be made in detail to the exemplary embodiments of the disclosure, examples of which are illustrated in the drawings. Wherever possible, the same reference numerals are used in the drawings and the description to refer to the same or similar parts.

Throughout the specification and the appended claims of the disclosure, certain terms may be used to refer to specific elements. It should be understood by persons skilled in the art that electronic device manufacturers may refer to the same element by different names. The disclosure does not intend to distinguish between elements with the same function but different names. In the following specification and claims, words such as "containing" and "comprising" are open-ended words, so the words should be interpreted as "including but not limited to . . . ".

Directional terms such as "upper", "lower", "front", "rear", "left", and "right" mentioned in the disclosure are only directions with reference to the drawings. Therefore, the used directional terms are used to illustrate, but not to limit, the disclosure. In the drawings, each drawing illustrates the general characteristics of a method, a structure, and/or a material used in a specific embodiment. However, the drawings should not be construed to define or limit the scope or nature covered by the embodiments. For example, the relative sizes, thicknesses, and positions of various film layers, regions, and/or structures may be reduced or enlarged for clarity.

When a structure (or layer, element, base) is described in the disclosure as being located on/above another structure (or layer, element, base), it may mean that the two structures are adjacent and directly connected or it may mean that the two structures are adjacent but not directly connected. Indirect connection means that there is at least one intermediate structure (or intermediate layer, intermediate element, intermediate base, intermediate spacing) between the two structures. A lower surface of one structure is adjacent or directly connected to an upper surface of the intermediate structure, and an upper surface of the other structure is adjacent or directly connected to a lower surface of the intermediate structure. The intermediate structure may be composed of a single-layer or multi-layer physical structure or non-physical structure, which is not limited. In the disclosure, when a certain structure is disposed "on" another structure, it may mean that the certain structure is "directly" on another structure or it may mean that the certain structure is "indirectly" on another structure, that is, at least one structure is also sandwiched between the certain structure and another structure.

The terms "about", "substantially", or "roughly" are generally interpreted as within 10% of a given value or range, or interpreted as within 5%, 3%, 2%, 1%, or 0.5% of the given value or range. In addition, the terms "a range is from a first value to a second value" and "the range is between the first value and the second value" mean that the range includes the first value, the second value, and other values therebetween.

Ordinal numbers such as "first" and "second" used in the specification and the claims are used to modify elements and do not imply and represent that the element(s) have any previous ordinal numbers, nor do they represent the order of a certain element and another element or the order of a manufacturing method. The use of the ordinal numbers is only used to clearly distinguish between an element with a certain name and another element with the same name. The claims and the specification may not use the same terms, whereby a first component in the specification may be a second component in the claims.

Electrical connection or coupling described in the disclosure may refer to direct connection or indirect connection. In the case of direct connection, terminals of elements on two circuits are directly connected or connected to each other by a conductor segment. In the case of indirect connection, there is a switch, a diode, a capacitor, an inductor, a resistor, other suitable elements, or a combination of the above elements between the terminals of the elements on the two circuits, but not limited thereto.

In the disclosure, the measurement manner of thickness, length, and width may be by adopting an optical microscope, and thickness or width may be obtained by measuring a cross-sectional image in an electron microscope, but not limited thereto. In addition, there may be a certain error in any two values or directions for comparison. Furthermore, the term "a given range is from a first value to a second value", "the given range falls within a range of the first value to the second value", or "the given range is between the first value and the second value" means that the given range includes the first value, the second value, and other values therebetween. If a first direction is perpendicular to a second direction, an angle between the first direction and the second direction may be between 80 degrees and 100 degrees; and if the first direction is parallel to the second direction, the angle between the first direction and the second direction may be between 0 degrees and 10 degrees.

Unless otherwise defined, all terms (including technical and scientific terms) used herein have the same meaning as commonly understood by persons skilled in the art to which the disclosure belongs. It is understood that the terms such as the terms defined in commonly used dictionaries should be interpreted as having meanings consistent with the relevant art and the background or context of the disclosure, and should not be interpreted in an idealized or overly formal manner, unless otherwise defined in the embodiments of the disclosure.

In the disclosure, an electronic device may include a display device, a backlight device, a sensing device, or a splicing device, but not limited thereto. The electronic device may be a bendable or flexible electronic device. The display device may be a non-self-luminous display device or a self-luminous display device. The display device may, for example, include liquid crystal, a light emitting diode, fluorescence, phosphor, quantum dot (QD), other suitable display media, or a combination of the above. An antenna may be a liquid crystal antenna or a varactor diode antenna. The sensing device may be a sensing device for sensing capacitance, light, thermal energy, or ultrasonic waves, but not limited thereto. In the disclosure, the electronic device may include an electronic element. The electronic element may include a passive element and an active element, such as a capacitor, a resistor, an inductor, a diode, and a transistor. The diode may include a light emitting diode, a varactor diode, or a photodiode. The light emitting diode may include, for example, an organic light emitting diode (OLED), a mini LED, a micro LED, or a quantum dot LED, but not limited thereto. The splicing device may be, for example, a display splicing device, but not limited thereto. It should be noted that the electronic device may be any permutation and combination of the above, but not limited thereto. In addition, the shape of the electronic device may be rectangular, circular, polygonal, a shape with curved edges, or other suitable shapes. The electronic device may have a peripheral system such as a driving system, a control system, and a light source system to support the display device, the antenna device, a wearable device (such as including augmented reality or virtual reality), a vehicle-mounted device (such as including a car windshield), or the splicing device.

It should be noted that in the following embodiments, the features in several different embodiments may be replaced, recombined, and mixed to complete other embodiments without departing from the spirit of the disclosure. As long as the features of the embodiments do not violate the spirit of the invention or conflict with each other, the features may be arbitrarily mixed and matched for use.

Figure 2:
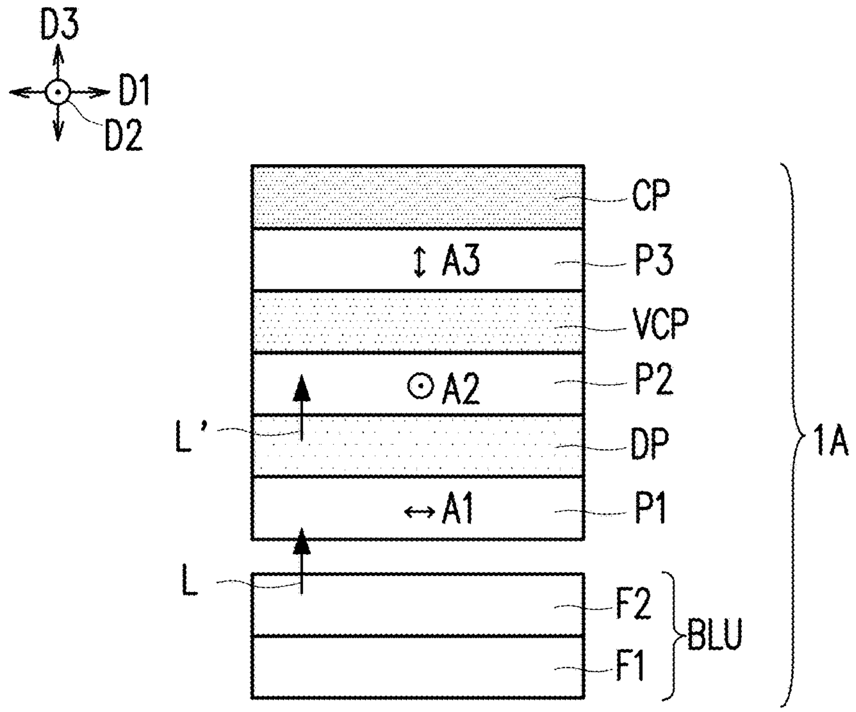
Figure 3:
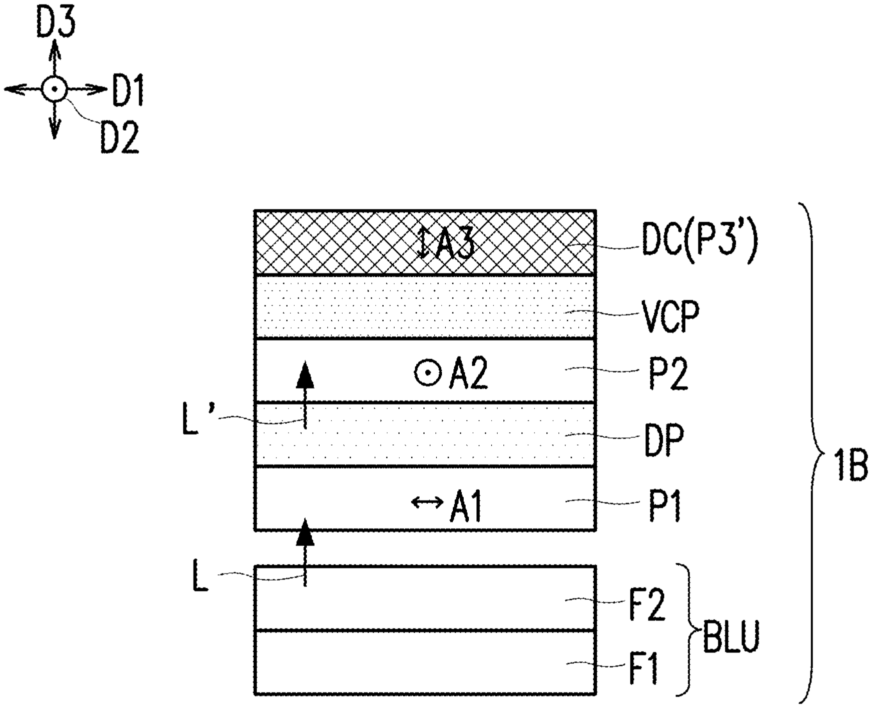
Figure 4A:
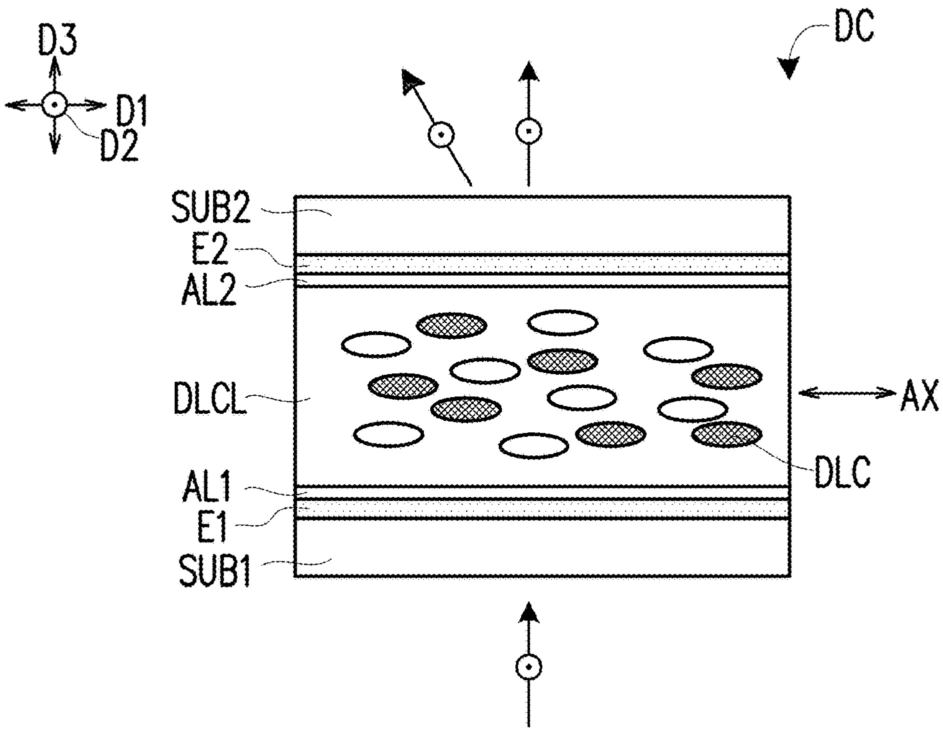
FIG. 4A and FIG. 4B are respectively partial cross-sectional schematic views of a dye liquid crystal panel in a general display mode and a privacy mode according to some embodiments of the disclosure.
Figure 4B:
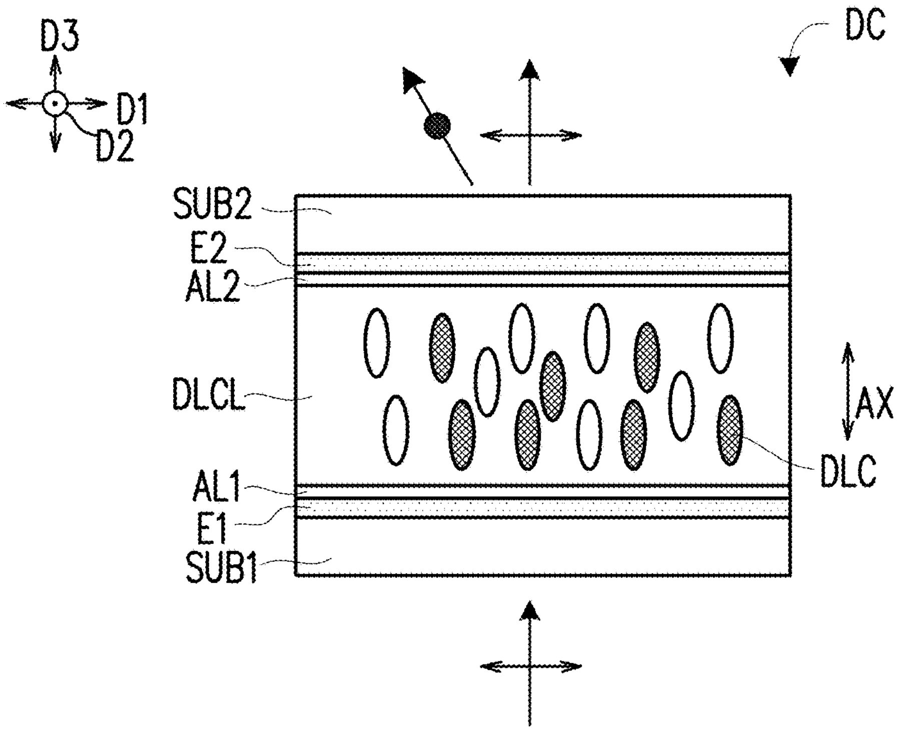
Figure 5:
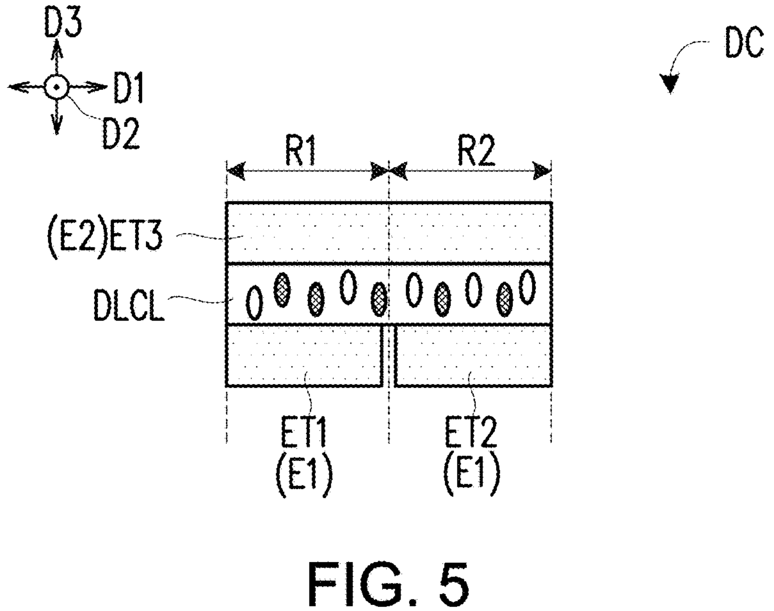
FIG. 5 is a partial cross-sectional schematic view of a dye liquid crystal panel according to some embodiments of the disclosure.
Figure 6:
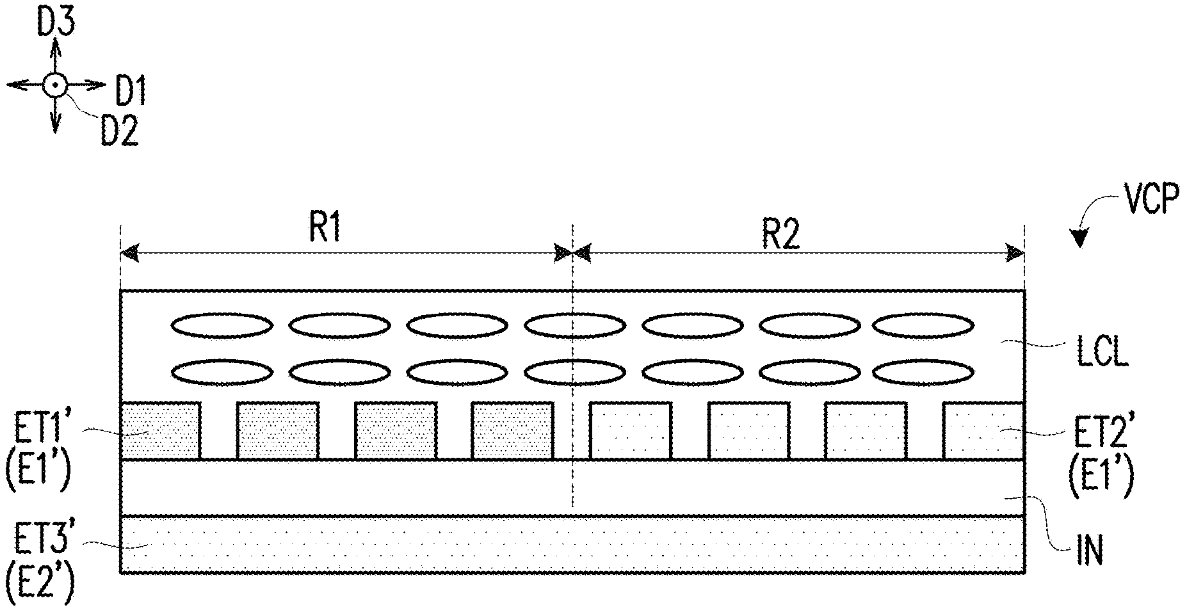
FIG. 6 and FIG. 7 are respectively partial cross-sectional views of two viewing angle control panels according to some embodiments of the disclosure.
Figure 7:
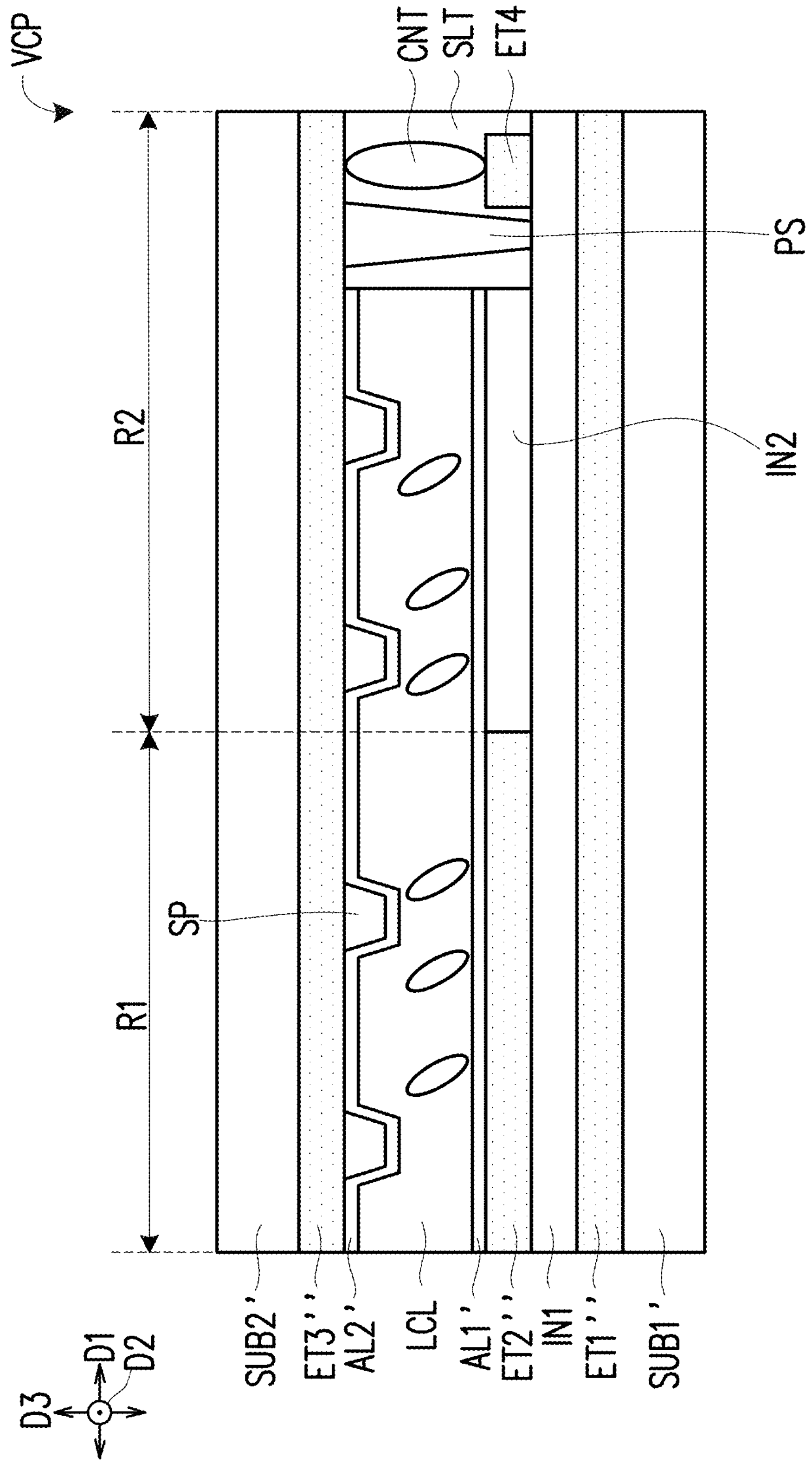
Figure 8:
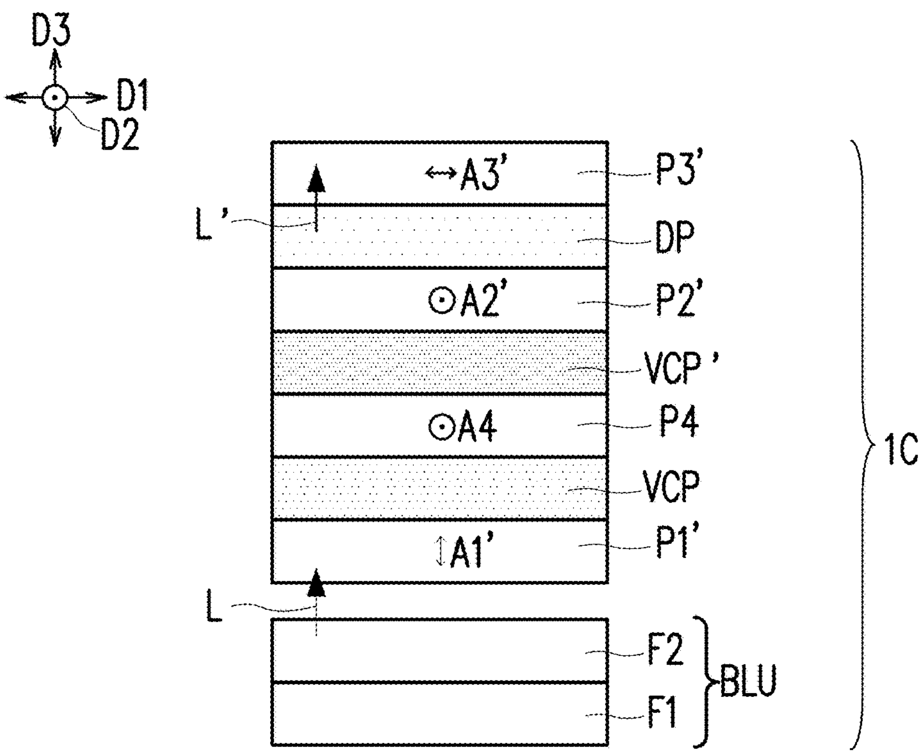
FIG. 8 to FIG. 10 are respectively partial cross-sectional schematic views of various display devices according to some embodiments of the disclosure.
Figure 9:
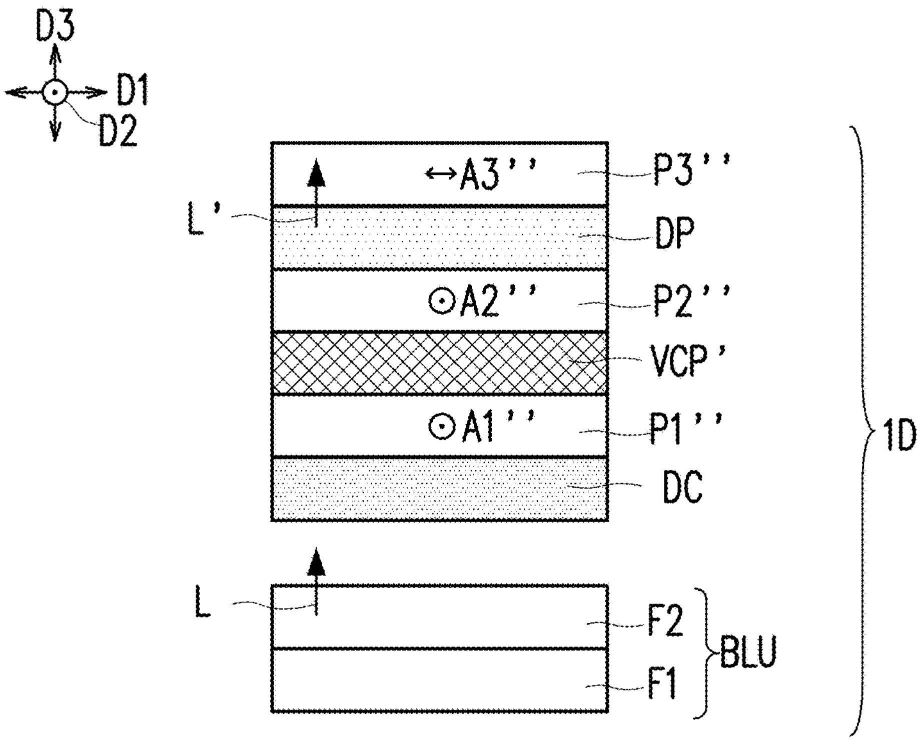
Figure 10:
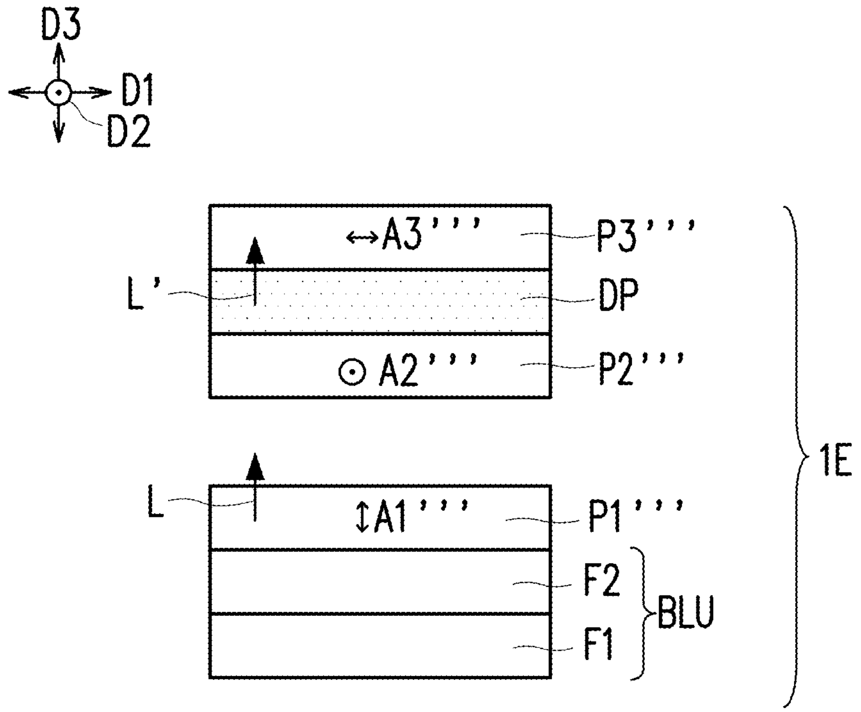

FIG. 1 to FIG. 3 are respectively partial cross-sectional schematic views of various display devices according to some embodiments of the disclosure. FIG. 4A and FIG. 4B are respectively partial cross-sectional schematic views of a dye liquid crystal panel in a general display mode and a privacy mode according to some embodiments of the disclosure. FIG. 5 is a partial cross-sectional schematic view of a dye liquid crystal panel according to some embodiments of the disclosure. FIG. 6 and FIG. 7 are respectively partial cross-sectional views of two viewing angle control panels according to some embodiments of the disclosure. FIG. 8 to FIG. 10 are respectively partial cross-sectional schematic views of various display devices according to some embodiments of the disclosure.

Please refer to FIG. 1, a display device 1 may include a backlight BLU, a display panel DP, a viewing angle control panel VCP, a first polarizing unit P1, a second polarizing unit P2, and a third polarizing unit P3. The backlight BLU is configured to provide an illumination light L. The display panel DP is disposed on a transmission path of the illumination light L to convert the illumination light L into a display light L'. The viewing angle control panel VCP is configured to control a light emission angle of the display device 1. Specifically, in the embodiment, the viewing angle control panel VCP is configured to control a light emission angle of the display light L'. The first polarizing unit P1 is disposed between the backlight BLU and the display panel DP and has a first absorption axis A1. The second polarizing unit P2 is disposed between the display panel DP and the viewing angle control panel VCP and has a second absorption axis A2. The third polarizing unit P3 is disposed on the viewing angle control panel VCP and has a third absorption axis A3. The third absorption axis A3 is perpendicular to the first absorption axis A1 and the second absorption axis A2, and the first absorption axis A1 and the second absorption axis A2 are perpendicular to each other on the same plane (such as a plane formed by a direction D1 and a direction D2).

In some embodiments, as shown in FIG. 1, the first polarizing unit P1, the display panel DP, the second polarizing unit P2, the viewing angle control panel VCP, and the third polarizing unit P3 may be sequentially disposed on the backlight BLU, but not limited thereto.

The backlight BLU may be a direct type backlight or an edge type backlight, but not limited thereto. The illumination light L provided by the backlight BLU is, for example, a monochromatic light and may be adjusted according to different requirements (such as improving the uniformity of the illumination light L and the brightness of the illumination light L, and satisfying a specific light type or the directivity of the illumination light L). The backlight BLU may include multiple optical films, such as an optical film F1 and an optical film F2, but not limited thereto. In some embodiments, the optical film F1 and the optical film F2 are respectively, for example, a brightness enhancement film (BEF) and a dual brightness enhancement film (DBEF), but not limited thereto. In some embodiments, the optical film F1 may be a single optical film or multiple optical films. For example, the optical film F1 may include two staggered brightness enhancement films, but not limited thereto. Although not shown, the backlight BLU may also include other elements or film layers, such as light emitting elements, light conversion layers, reflective sheets, light guide plates, and/or diffusion sheets, but not limited thereto.

The first polarizing unit P1 is, for example, disposed between the optical film F2 and the display panel DP. For example, the first polarizing unit P1 may include a polarizer, such as an absorptive polarizer or a reflective polarizer, but not limited thereto. The first absorption axis A1 of the first polarizing unit P1 may be perpendicular to a polarization direction of the illumination light L from the backlight BLU. For example, the polarization direction of the illumination light L from the backlight BLU may be parallel to the direction D2, and the first absorption axis A1 of the first polarizing unit P1 is parallel to the direction D1.

The display panel DP is disposed on a light emission side of the backlight BLU and is, for example, disposed between the first polarizing unit P1 and the second polarizing unit P2. The display panel DP may be configured to convert the illumination light L into the display light L' with display information (such as grayscale or color). The display panel DP is, for example, a non-self-luminous display panel, such as a liquid crystal display panel, but not limited thereto. The type of the liquid crystal display panel is not limited.

The second polarizing unit P2 is, for example, disposed between the display panel DP and the viewing angle control panel VCP. For example, the second polarizing unit P2 may include a polarizer, such as an absorptive polarizer or a reflective polarizer, but not limited thereto. The second absorption axis A2 of the second polarizing unit P2 may be perpendicular to the first absorption axis A1 of the first polarizing unit P1. For example, the second absorption axis A2 of the second polarizing unit P2 may be parallel to the direction D2.

The viewing angle control panel VCP is disposed on a light emission side of the display panel DP and is, for example, disposed between the second polarizing unit P2 and the third polarizing unit P3. The viewing angle control panel VCP may be configured to control the light emission angle of the display device 1. The light emission angle of the display light L' refers to an included angle between the display light L' emitted from the display device 1 and a normal direction (such as a direction D3) of the display device 1.

In some embodiments, the viewing angle control panel VCP may be an electronically controlled viewing angle control panel, and the display device 1 can be switched to general display mode (a large light emission angle) or a privacy mode (a small light emission angle) according to user requirements through, for example, changing a voltage applied to the viewing angle control panel VCP. In the embodiments, although not shown, the viewing angle control panel VCP may include two light transmitting substrates facing each other, two light transmitting electrode layers disposed between the two light transmitting substrates, and a dielectric layer disposed between the two light transmitting electrode layers.

The light transmitting substrate may be a hard substrate or a flexible substrate. The material of the light transmitting substrate includes, for example, glass, quartz, ceramics, sapphire, or plastic, but not limited thereto. The plastic may include polycarbonate (PC), polyimide (PI), polypropylene (PP), polyethylene terephthalate (PET), other suitable flexible materials, or a combination of the above materials, but not limited thereto. The material of the light transmitting electrode layer includes, for example, metal oxide, graphene, other suitable transparent conductive materials, or a combination of the above. The metal oxide may include indium tin oxide, indium zinc oxide, aluminum tin oxide, aluminum zinc oxide, indium gallium zinc oxide, indium germanium zinc oxide, or other metal oxides. The dielectric layer may be a liquid crystal layer, such as twisted nematic (TN) liquid crystal or in-plane-switching (IPS) liquid crystal, but not limited thereto.

The third polarizing unit P3 is, for example, disposed on the viewing angle control panel VCP. For example, the third polarizing unit P3 may include a polarizer, such as an absorptive polarizer or a reflective polarizer, but not limited thereto. The third absorption axis A3 of the third polarizing unit P3 may be perpendicular to the first absorption axis A1 of the first polarizing unit P1 and the second absorption axis A2 of the second polarizing unit P2. For example, the third absorption axis A3 of the third polarizing unit P3 may be parallel to the direction D3.

Table 1 shows the polarization state of light after passing through each film layer in the general display mode and the privacy mode of the display device 1. In Table 1, "front view" means that an included angle between a line of sight of a user and the normal direction (such as the direction D3) of the display device 1 is approximately 0 degrees, and "side view" means that the included angle between the line of sight of the user and the normal direction (such as the direction D3) of the display device 1 is greater than 30 degrees (for example, the included angle between the line of sight of the user and the normal direction of the display device 1 is approximately 90 degrees). "↔" means that the polarization state of the light is parallel to the direction D1 in FIG. 1, "⊙" means that the polarization state of the light is parallel to the direction D2 in FIG. 1, and "•" means that light is blocked.

TABLE 1

| | General display mode "Front view" | General display mode "Side view" | Privacy mode "Front view" | Privacy mode "Side view" |
|---|---|---|---|---|
| BLU | ⊙ | ⊙ | ⊙ | ⊙ |
| P1 | ⊙ | ⊙ | ⊙ | ⊙ |
| DP | ↔ | ↔ | ↔ | ↔ |
| P2 | ↔ | ↔ | ↔ | ↔ |
| VCP | ⊙ | ⊙ | ↔ | ↔ |
| P3 | ⊙ | ⊙ | ↔ | ● |

As can be seen from Table 1, a polarization direction of light emitted from the backlight BLU is parallel to the direction D2. Since a transmission axis (perpendicular to the first absorption axis A1) of the first polarizing unit P1 is parallel to the direction D2, the light can pass through the first polarizing unit P1, and after the light passes through the first polarizing unit P1, the polarization direction of the light remains parallel to the direction D2. In both the general display mode and the privacy mode, the display panel DP rotates the polarization direction of the light by 90 degrees. Therefore, after the light passes through the display panel DP, the polarization direction of the light becomes parallel to the direction D1. Since a transmission axis (perpendicular to the second absorption axis A2) of the second polarizing unit P2 is parallel to the direction D1, the light can pass through the second polarizing unit P2, and after the light passes through the second polarizing unit P2, the polarization direction of the light remains parallel to the direction D1. In the general display mode, the viewing angle control panel VCP rotates the polarization direction of the light by 90 degrees, and in privacy mode, the viewing angle control panel VCP allows the light to penetrate directly without changing the polarization direction of the light. Therefore, after the light passes through the viewing angle control panel VCP, the polarization direction of the light in the general display mode becomes parallel to the direction D2, and the polarization direction of the light in the privacy mode remains parallel to the direction D1.

In the general display mode, whether viewed from a front viewing angle or a side viewing angle, the polarization direction (parallel to the direction D2) of the light is perpendicular to the third absorption axis A3 of the third polarizing unit P3, so the light can pass through the third polarizing unit P3, and after the light passes through the third polarizing unit P3, the polarization direction of the light remains parallel to the direction D2. In the privacy mode, when viewed from the front viewing angle, the polarization direction (parallel to the direction D1) of the light is perpendicular to the third absorption axis A3 of the third polarizing unit P3, so the light can pass through the third polarizing unit P3, and after the light passes through the third polarizing unit P3, the polarization direction of the light remains parallel to the direction D1. On the other hand, in the privacy mode, when viewed from the side viewing angle, the polarization direction (parallel to the direction D1) of the light is close to parallel to the third absorption axis A3 of the third polarizing unit P3, so the light is blocked the third polarizing unit P3 under the side view.

Based on the above, through the configurations of the viewing angle control panel VCP and the third polarizing unit P3, issues such as light leakage or color cast at a large viewing angle can be improved, thereby improving the display quality of the display device 1 in the privacy mode.

Please refer to FIG. 2. The main difference between a display device 1A and the display device 1 of FIG. 1 is that the display device 1A further includes a circular polarizer CP, and the circular polarizer CP is disposed on the third polarizing unit P3. Through configuring the circular polarizer CP on a light emission side of the third polarizing unit P3, light emitted from the display device 1A may be converted into circularly polarized light. In this way, when the display device 1A is applied as a car display device, the user can see an image displayed by the display device 1A even when wearing sunglasses. In some embodiments, a circular polarizer may include a λ/2 wave plate, a λ/4 wave plate, and a polarizer, and the λ/2 wave plate may be disposed between the λ/4 wave plate and the polarizer (not shown), but not limited thereto. In other embodiments, a circular polarizer may include a λ/4 wave plate and a polarizer. In other embodiments, a circular polarizer may include a λ/4 wave plate and a λ/2 wave plate. In other embodiments, a circular polarizer may be a λ/2 wave plate.

Please refer to FIG. 3. The main difference between a display device 1B and the display device 1 of FIG. 1 is that a third polarizing unit P3' in the display device 1B includes a dye liquid crystal panel DC. Under the architecture, a long axis direction AX (see FIG. 4B) of dye liquid crystal (such as a dye liquid crystal DLC of FIG. 4B) in the dye liquid crystal panel DC in the privacy mode is defined as an axial direction of the third absorption axis A3 of the third polarizing unit P3'.

FIG. 4A and FIG. 4B schematically illustrate an implementation form of the dye liquid crystal panel DC. Please refer to FIG. 4A and FIG. 4B. The dye liquid crystal panel DC may include two light transmitting substrates (such as a light transmitting substrate SUB1 and a light transmitting substrate SUB2) facing each other, two light transmitting electrode layers (such as a light transmitting electrode layer E1 and a light transmitting electrode layer E2) disposed between the two light transmitting substrates, two alignment layers (such as an alignment layer AL1 and an alignment layer AL2) disposed between the two light transmitting electrode layers, and a dye liquid crystal layer DLCL disposed between the two alignment layers. For relevant content of the light transmitting substrate and the light transmitting electrode layer, please refer to the above and will not be repeated here.

The materials of the two alignment layers include, for example, polyimide (PI), but not limited thereto. The dye liquid crystal layer DLCL may include a vertical alignment (VA) liquid crystal layer or an electrically controlled birefringence (ECB) liquid crystal layer, but not limited thereto. In the embodiment in which the dye liquid crystal layer DLCL includes the vertical alignment liquid crystal layer, when a voltage difference between the light transmitting electrode layer E1 and the light transmitting electrode layer E2 is equal to zero, the long axis direction AX of liquid crystal (including the dye liquid crystal DLC) in the dye liquid crystal layer DLCL is, for example, parallel or approximately parallel to the direction D3 (in an upright state), and when the voltage difference between the light transmitting electrode layer E1 and the light transmitting electrode layer E2 is greater than zero, the long axis direction AX of the liquid crystal (including the dye liquid crystal DLC) in the dye liquid crystal layer DLCL is, for example, parallel or approximately parallel to the direction D1 (in a flat lying state). On the other hand, in the embodiment in which the dye liquid crystal layer DLCL includes the electronically controlled birefringent liquid crystal layer, when a voltage difference between the light transmitting electrode layer E1 and the light transmitting electrode layer E2 is greater than zero, the long axis direction AX of liquid crystal (including the dye liquid crystal DLC) in the dye liquid crystal layer DLCL is parallel or approximately parallel to the direction D3 (in an upright state), and when the voltage difference between the light transmitting electrode layer E1 and the light transmitting electrode layer E2 is equal to zero, the long axis direction AX of the liquid crystal (including the dye liquid crystal DLC) in the dye liquid crystal layer DLCL is parallel or approximately parallel to the direction D1 (in a flat lying state).

Table 2 shows the polarization state of light after passing through each film layer in the general display mode and the privacy mode of the display device 1B.

TABLE 2

| | General display mode "Front view" | General display mode "Side view" | Privacy mode "Front view" | Privacy mode "Side view" |
|---|---|---|---|---|
| BLU | ⊙ | ⊙ | ⊙ | ⊙ |
| P1 | ⊙ | ⊙ | ⊙ | ⊙ |
| DP | ↔ | ↔ | ↔ | ↔ |
| P2 | ↔ | ↔ | ↔ | ↔ |
| VCP | ⊙ | ⊙ | ↔ | ↔ |
| DC(P3') | ⊙ | ⊙ | ↔ | ● |

It can be seen from Table 2 that after the light passes through the viewing angle control panel VCP, the polarization direction of the light in the general display mode becomes parallel to the direction D2, and the polarization direction of the light in the privacy mode remains parallel to the direction D1.

Referring to Table 2 and FIG. 4A, in the general display mode, whether viewed from the front viewing angle or the side viewing angle, the polarization direction (parallel to the direction D2) of the light is perpendicular to the third absorption axis A3 (the long axis direction AX of the dye liquid crystal DLC) of the third polarizing unit P3', so the light can pass through the third polarizing unit P3', and after the light passes through the third polarizing unit P3', the polarization direction of the light remains parallel to the direction D2. Referring to Table 2 and FIG. 4B, in the privacy mode, when viewed from the front viewing angle, the polarization direction (parallel to the direction D1) of the light is perpendicular to the third absorption axis A3 (the long axis direction AX of the dye liquid crystal DLC) of the third polarizing unit P3', so the light can pass through the third polarizing unit P3', and after the light passes through the third polarizing unit P3', the polarization direction of the light remains parallel to the direction D1. On the other hand, in the privacy mode, when viewed from the side viewing angle, the polarization direction (parallel to the direction D1) of the light is close to parallel to the third absorption axis A3 (the long axis direction AX of the dye liquid crystal DLC) of the third polarizing unit P3', so the light is blocked by the third polarizing unit P3' under the side view.

According to the above, through the configurations of the viewing angle control panel VCP and the third polarizing unit P3' (the dye liquid crystal panel DC), the privacy effect can be achieved through changing the long axis direction AX of the dye liquid crystal DLC, thereby improving the display quality of the display device 1B in the privacy mode.

In some embodiments, as shown in FIG. 5, a divisional privacy function can be achieved through patterning at least one light transmitting electrode layer (such as the light transmitting electrode layer E1 in FIG. 4A) in the dye liquid crystal panel DC. For the sake of simplicity of the drawings and the description, FIG. 5 omits the illustration of the two substrates and the two alignment layers of the dye liquid crystal panel.

In some embodiments, as shown in FIG. 5, the dye liquid crystal panel DC may include a first light transmitting electrode ET1, a second light transmitting electrode ET2, and a third light transmitting electrode ET3. The first light transmitting electrode ET1 is, for example, disposed in a first region R1. The second light transmitting electrode ET2 is, for example, disposed in a second region R2. The first light transmitting electrode ET1 and the second light transmitting electrode ET2 may belong to the same layer (such as the light transmitting electrode layer E1) and are separated from each other. The third light transmitting electrode ET3 is disposed in the first region R1 and the second region R2 and is located on one side of the first light transmitting electrode ET1 and the second light transmitting electrode ET2.

For example, the dye liquid crystal layer DLCL in the dye liquid crystal panel DC may be a vertical alignment liquid crystal layer or an electronically controlled birefringence liquid crystal layer. The third light transmitting electrode ET3 may be used as a common electrode, the third light transmitting electrode ET3 overlaps with the first light transmitting electrode ET1 and the second light transmitting electrode ET2 in the direction D3, and the first light transmitting electrode ET1 and the second light transmitting electrode ET2 do not overlap with each other in the direction D3. The third light transmitting electrode ET3 is not on the same layer as the first light transmitting electrode ET1 and the second light transmitting electrode ET2. For example, the third light transmitting electrode ET3 may belong to the light transmitting electrode layer (such as the light transmitting electrode layer E2) above the first light transmitting electrode ET1 and the second light transmitting electrode ET2, and the light transmitting electrode layer E2 and the light transmitting electrode layer E1 are respectively, for example, located on opposite sides of the dye liquid crystal layer DLCL, but not limited thereto.

Through separating the first light transmitting electrode ET1 and the second light transmitting electrode ET2 from each other, voltages applied to the first light transmitting electrode ET1 and the second light transmitting electrode ET2 may be independently controlled. Through controlling a voltage difference/an electric field between the first light transmitting electrode ET1 and the third light transmitting electrode ET3, the mode (such as the general display mode or the privacy mode) of the first region R1 can be switched. Through controlling a voltage difference/an electric field between the second light transmitting electrode ET2 and the third light transmitting electrode ET3, the mode (such as the general display mode or the privacy mode) of the second region R2 can be switched. Since the mode of each region can be independently controlled, the mode of the first region R1 may be the same as or different from the mode of the second region R2. For example, when the first region R1 is in the general display mode, the second region R2 may be in the general display mode or the privacy mode, and when the first region R1 is in the privacy mode, the second region R2 may be in the general display mode or the privacy mode.

Although the above embodiment uses the dye liquid crystal panel DC as an example to illustrate the method of implementing the divisional privacy function, the disclosure is not limited thereto. In some embodiments, the method may also be applied to the viewing angle control panel. FIG. 6 schematically illustrates an implementation form of the viewing angle control panel VCP. For the sake of simplicity of the drawings and the description, FIG. 6 omits the illustration of some film layers (such as the two substrates and the two alignment layers) of the viewing angle control panel VCP.

In some embodiments, as shown in FIG. 6, the viewing angle control panel VCP may include a first light transmitting electrode ET1', a second light transmitting electrode ET2', and a third light transmitting electrode ET3'. The first light transmitting electrode ET1' is, for example, disposed in the first region R1. The second light transmitting electrode ET2' is, for example, disposed in the second region R2. The first light transmitting electrode ET1' and the second light transmitting electrode ET2' may belong to the same layer (such as a light transmitting electrode layer E1') and are separated from each other. The third light transmitting electrode ET3' is disposed in the first region R1 and the second region R2 and is located on one side of the first light transmitting electrode ET1' and the second light transmitting electrode ET2'.

For example, a liquid crystal layer LCL in the viewing angle control panel VCP may be a twisted nematic liquid crystal layer or an in-plane-switching liquid crystal layer. The third light transmitting electrode ET3' may be used as a common electrode, the third light transmitting electrode ET3' overlaps with the first light transmitting electrode ET1' and the second light transmitting electrode ET2' in the direction D3, and the first light transmitting electrode ET1' and the second light transmitting electrode ET2' do not overlap with each other in the direction D3. The third light transmitting electrode ET3' is not on the same layer as the first light transmitting electrode ET1' and the second light transmitting electrode ET2'. For example, the third light transmitting electrode ET3' may belong to a light transmitting electrode layer (such as a light transmitting electrode layer E2') below the first light transmitting electrode ET1' and the second light transmitting electrode ET2', wherein the light transmitting electrode layer E2' and the light transmitting electrode layer E1' are, for example, located on the same side of the liquid crystal layer LCL and are electrically insulated from each other through an insulating layer IN, but not limited thereto.

Through separating the first light transmitting electrode ET1' and the second light transmitting electrode ET2' from each other, voltages applied to the first light transmitting electrode ET1' and the second light transmitting electrode ET2' may be independently controlled. Through controlling a voltage difference/an electric field between the first light transmitting electrode ET1' and the third light transmitting electrode ET3', the mode (such as the general display mode or the privacy mode) of the first region R1 can be switched. Through controlling a voltage difference/an electric field between the second light transmitting electrode ET2' and the third light transmitting electrode ET3', the mode (such as the general display mode or the privacy mode) of the second region R2 can be switched. Since the mode of each region can be independently controlled, the mode of the first region R1 may be the same as or different from the mode of the second region R2. For example, when the first region R1 is in the general display mode, the second region R2 may be in the general display mode or the privacy mode, and when the first region R1 is in the privacy mode, the second region R2 may be in the general display mode or the privacy mode.

FIG. 7 schematically illustrates another implementation form of the viewing angle control panel VCP. For the sake of simplicity of the drawings and the description, FIG. 7 only illustrates some film layers of the viewing angle control panel VCP.

In some embodiments, as shown in FIG. 7, the viewing angle control panel VCP may include a first light transmitting electrode ET1", a second light transmitting electrode ET2", and a third light transmitting electrode ET3". The first light transmitting electrode ET1" is, for example, disposed in the first region R1 and the second region R2. The second light transmitting electrode ET2" is, for example, disposed in the first region R1 and is above the first light transmitting electrode ET1". The third light transmitting electrode ET3" is, for example, disposed in the first region R1 and the second region R2 and is above the second light transmitting electrode ET2".

For example, the liquid crystal layer LCL in the viewing angle control panel VCP may be a twisted nematic liquid crystal layer, a vertical alignment liquid crystal layer, or an electrically controlled birefringence liquid crystal layer. The first light transmitting electrode ET1", the second light transmitting electrode ET2", and the third light transmitting electrode ET3" belong to different layers, wherein the first light transmitting electrode ET1" and the second light transmitting electrode ET2" are located on the same side of the liquid crystal layer LCL, and the second light transmitting electrode ET2" is located between the first light transmitting electrode ET1" and the liquid crystal layer LCL. For example, the first light transmitting electrode ET1" and the second light transmitting electrode ET2" are electrically insulated from each other, for example, through an insulating layer IN1, and the first light transmitting electrode ET1" is located between the insulating layer IN1 and a substrate SUB1'. The second light transmitting electrode ET2" and the third light transmitting electrode ET3" are respectively located on opposite sides of the liquid crystal layer LCL, and the third light transmitting electrode ET3" is, for example, located between the liquid crystal layer LCL and a substrate SUB2'.

In some embodiments, the viewing angle control panel VCP may further include an insulating layer IN2. The insulating layer IN2 is disposed on the insulating layer IN1 and is located in the second region R2, wherein the insulating layer IN2 and the second light transmitting electrode ET2" provide a plane carrying an alignment layer AL1'.

In some embodiments, the viewing angle control panel VCP may further include multiple spacers SP. The spacers SP are disposed on a surface of the third light transmitting electrode ET3" facing the liquid crystal layer LCL and is located between an alignment layer AL2' and the third light transmitting electrode ET3".

In some embodiments, the viewing angle control panel VCP may further include an electrode ET4, a connector CNT, a support PS, and a sealant SLT. The electrode ET4 is disposed on the insulating layer IN1 and may belong to the same layer as and be separated/electrically insulated from the second light transmitting electrode ET2". The connector CNT (such as a gold ball) is disposed between the third light transmitting electrode ET3" and the electrode ET4, and the third light transmitting electrode ET3" may be electrically connected to an external circuit through the connector CNT and the electrode ET4. The support PS is supported between the third light transmitting electrode ET3" and the insulating layer IN1. For example, the support PS may be a photo spacer (PS). The sealant SLT is disposed between the third light transmitting electrode ET3" and the insulating layer IN1 and laterally covers the electrode ET4, the connector CNT, and the support PS.

Through controlling a voltage difference/an electric field between the second light transmitting electrode ET2" and the third light transmitting electrode ET3", the mode (such as the general display mode or the privacy mode) of the first region R1 can be switched. Through controlling a voltage difference/an electric field between the first light transmitting electrode ET1" and the third light transmitting electrode ET3", the mode (such as the general display mode or the privacy mode) of the second region R2 can be switched. Since the mode of each region can be independently controlled, the mode of the first region R1 may be the same as or different from the mode of the second region R2. For example, when the first region R1 is in the general display mode, the second region R2 may be in the general display mode or the privacy mode, and when the first region R1 is in the privacy mode, the second region R2 may be in the general display mode or the privacy mode.

In any embodiment of the disclosure that is provided with the dye liquid crystal panel, the structure as shown in FIG. 5 may be adopted to implement the divisional privacy function. In addition, in any embodiment of the disclosure that is provided with the viewing angle control panel, the structure as shown in FIG. 6 or FIG. 7 may be adopted to implement the divisional privacy function. There will be no reiteration below.

Please refer to FIG. 8. A display device 1C may include a backlight BLU, a display panel DP, a viewing angle control panel VCP, a first polarizing unit P1', a second polarizing unit P2', and a third polarizing unit P3'. The backlight BLU is configured to provide an illumination light L. The display panel DP is disposed on a transmission path of the illumination light L to convert the illumination light L into a display light L'. The viewing angle control panel VCP is configured to control a light emission angle of the display device 1C. Specifically, in the embodiment, the viewing angle control panel VCP may be configured to control a light emission angle of the illumination light L. The first polarizing unit P1' is disposed between the backlight BLU and the display panel DP and has a first absorption axis A1'. The second polarizing unit P2' is disposed between the display panel DP and the viewing angle control panel VCP and has a second absorption axis A2'. The third polarizing unit P3' is disposed on the display panel DP and has a third absorption axis A3'. The third absorption axis A3' and the second absorption axis A2' are perpendicular to each other on the same plane (such as a plane formed by a direction D1 and a direction D2), and the first absorption axis A1' is perpendicular to the second absorption axis A2' and the third absorption axis A3'.

In some embodiments, as shown in FIG. 8, the first polarizing unit P1', the viewing angle control panel VCP, the second polarizing unit P2', the display panel DP, and the third polarizing unit P3' may be sequentially disposed on the backlight BLU, but not limited thereto.

For the relevant description of the backlight BLU, please refer to the above and will not be repeated here. In some embodiments, an optical film F1 and an optical film F2 are respectively, for example, a brightness enhancement film and a diffusion sheet, but not limited thereto.

The first polarizing unit P1' is, for example, disposed between the optical film F2 and the viewing angle control panel VCP. For example, the first polarizing unit P1' may include a polarizer, such as an absorptive polarizer or a reflective polarizer, but not limited thereto. The first absorption axis A1' of the first polarizing unit P1' may be perpendicular to a polarization direction of the illumination light L from the backlight BLU. For example, the polarization direction of the illumination light L from the backlight BLU may be parallel to the direction D1 or the direction D2, and the first absorption axis A1' of the first polarizing unit P1' is parallel to a direction D3.

The viewing angle control panel VCP is, for example, disposed between the first polarizing unit P1' and the second polarizing unit P2'. For the relevant description of the viewing angle control panel VCP, please refer to the above and will not be repeated here.

The second polarizing unit P2' is, for example, disposed between the viewing angle control panel VCP and the display panel DP. For example, the second polarizing unit P2' may include a polarizer, such as an absorptive polarizer or a reflective polarizer, but not limited thereto. The second absorption axis A2' of the second polarizing unit P2' may be, for example, parallel to the direction D2.

The display panel DP is, for example, disposed between the second polarizing unit P2' and the third polarizing unit P3'. For the relevant description of the display panel DP, please refer to the above and will not be repeated here.

The third polarizing unit P3' is, for example, disposed on the display panel DP. For example, the third polarizing unit P3' may include a polarizer or a dye liquid crystal panel. The polarizer includes, for example, an absorptive polarizer or a reflective polarizer, but not limited thereto. For the relevant description of the dye liquid crystal panel, please refer to the above and will not be repeated here. The third absorption axis A3' of the third polarizing unit P3' may be, for example, parallel to the direction D1.

According to different requirements, the display device 1C may further include other elements or film layers. For example, the display device 1C may further include another viewing angle control panel (such as a viewing angle control panel VCP' shown in FIG. 8). The viewing angle control panel VCP' is disposed between the viewing angle control panel VCP and the second polarizing unit P2'. In some embodiments, the viewing angle control panel VCP includes a first liquid crystal, the viewing angle control panel VCP' includes a second liquid crystal, and the second liquid crystal is different from the first liquid crystal. For example, the first liquid crystal may be a twisted nematic liquid crystal or an in-plane-switching liquid crystal, and the second liquid crystal may be an electronically controlled birefringence liquid crystal, but not limited thereto. In some embodiments, a light emission angle range controlled by the first liquid crystal is different from a light emission angle range controlled by the second liquid crystal. For example, the light emission angle range controlled by the first liquid crystal is 60 degrees to 80 degrees, and the light emission angle range controlled by the second liquid crystal is 30 degrees to 50 degrees, but not limited thereto.

In some embodiments, the display device 1C may further include a fourth polarizing unit P4. The fourth polarizing unit P4 is, for example, disposed between the viewing angle control panel VCP and the viewing angle control panel VCP'. For example, the fourth polarizing unit P4 may include a polarizer, such as an absorptive polarizer or a reflective polarizer, but not limited thereto. The fourth absorption axis A4 of the fourth polarizing unit P4 may be, for example, parallel to the direction D2.

Table 3 shows the polarization state of light after passing through each film layer in the general display mode and the privacy mode of the display device 1C.

TABLE 3

| | General display mode "Front view" | General display mode "Side view" | Privacy mode "Front view" | Privacy mode "Side view" |
|---|---|---|---|---|
| BLU | ⊙, ↔ | ⊙, ↔ | ⊙, ↔ | ⊙, ↔ |
| P1' | ⊙, ↔ | ⊙ | ⊙, ↔ | ⊙ |
| VCP | ↔, ⊙ | ↔ | ⊙, ↔ | ⊙ |
| P4 | ↔ | ↔ | ↔ | ● |
| VCP' | ↔ | ↔ | ↔ | |
| P2' | ↔ | ↔ | ↔ | |
| DP | ⊙ | ⊙ | ⊙ | |
| P3' | ⊙ | ⊙ | ⊙ | |

It can be seen from Table 3 that the polarization direction (↔) of a part of the light emitted from the backlight BLU is parallel to the direction D1 and the polarization direction (⊙) of another part of the light emitted from the backlight BLU is parallel to the direction D2. In the general display mode/privacy mode, when viewed from the front viewing angle, the polarization direction (parallel to the direction D1 or the direction D2) of the light is perpendicular to the first absorption axis A1' of the first polarizing unit P1', so the light can pass through the first polarizing unit P1', and after the light passes through the first polarizing unit P1', the polarization direction of the light remains parallel to the direction D1 or the direction D2. In the general display mode/privacy mode, when viewed from the side viewing angle, the polarization direction (parallel to the direction D2) of a part of the light is perpendicular to the first absorption axis A1' of the first polarizing unit P1', so the part of the light with the polarization direction parallel to the direction D2 can pass through the first polarizing unit P1'. On the other hand, in the general display mode/privacy mode, when viewed from the side viewing angle, the polarization direction (parallel to the direction D1) of another part of the light is close to parallel to the third absorption axis A3 of the third polarizing unit P3, so the part of the light with the polarization direction parallel to the direction D1 is blocked by the third polarizing unit P3 under the side view.

In the general display mode, the viewing angle control panel VCP rotates the polarization direction of the light by 90 degrees, so after the light passes through the viewing angle control panel VCP, the polarization direction of the light changes from being parallel to the direction D1 to being parallel to the direction D2 or from being parallel to the direction D2 to being parallel to the direction D1. On the other hand, in the privacy mode, the viewing angle control panel VCP allows the light to directly pass through without changing the polarization direction of the light.

Since a transmission axis of the fourth polarizing unit P4 is parallel to the direction D1, the part of the light with the polarization direction parallel to the direction D1 can pass through the fourth polarizing unit P4, and the part of the light with the polarization direction parallel to the direction D2 is blocked by the fourth polarizing unit P4.

In the general display mode/privacy mode, the viewing angle control panel VCP' allows the light to pass through. Since a transmission axis of the second polarizing unit P2' is parallel to the direction D1, the light can pass through the second polarizing unit P2', and after the light passes through the second polarizing unit P2', the polarization direction of the light remains parallel to the direction D1. In both the general display mode and the privacy mode, the display panel DP rotates the polarization direction of the light by 90 degrees, so after the light passes through the display panel DP, the polarization direction of the light becomes parallel to the direction D2. Since a transmission axis of the third polarizing unit P3' is parallel to the direction D2, the light can pass through the third polarizing unit P3', and after the light passes through the third polarizing unit P3', the polarization direction of the light remains parallel to the direction D2.

According to different requirements, the display device 1C may further include other elements or film layers. For example, although not shown, the display device 1C may further include a circular polarizer, and the circular polarizer may be disposed on the third polarizing unit P3' (refer to the circular polarizer CP of FIG. 2). In addition, in the display device 1C, the third polarizing unit P3' may replace the polarizer with the dye liquid crystal panel (refer to the dye liquid crystal panel DC of FIG. 3). Under the architecture of the third polarizing unit P3' adopting the dye liquid crystal panel, the dye liquid crystal panel may adopt the architecture of FIG. 5 to implement the divisional privacy function. In addition, at least one of the viewing angle control panel VCP and the viewing angle control panel VCP' may adopt the architecture of FIG. 6 or FIG. 7 to implement the divisional privacy function.

Please refer to FIG. 9. A display device 1D may include a backlight BLU, a display panel DP, a viewing angle control panel VCP', a first polarizing unit P1", a second polarizing unit P2", and a third polarizing unit P3". The backlight BLU is configured to provide an illumination light L. The display panel DP is disposed on a transmission path of the illumination light L to convert the illumination light L into a display light L'. The viewing angle control panel VCP' is configured to control a light emission angle of the display device 1D. The first polarizing unit P1" is disposed between the backlight BLU and the viewing angle control panel VCP' and has a first absorption axis A1". The second polarizing unit P2" is disposed between the display panel DP and the viewing angle control panel VCP' and has a second absorption axis A2". The third polarizing unit P3" is disposed on the display panel DP and has a third absorption axis A3". The third absorption axis A3" and the second absorption axis A2" are perpendicular to each other on the same plane (such as a plane formed by a direction D1 and a direction D2), and the first absorption axis A1" is parallel to the second absorption axis A2" and is perpendicular to the third absorption axis A3".

In some embodiments, as shown in FIG. 9, the first polarizing unit P1", the viewing angle control panel VCP', the second polarizing unit P2", the display panel DP, and the third polarizing unit P3" may be sequentially disposed on the backlight BLU.

For the relevant description of the backlight BLU, please refer to the above and will not be repeated here. In some embodiments, an optical film F1 and an optical film F2 are respectively, for example, a brightness enhancement film and a dual brightness enhancement film, but not limited thereto.

The first polarizing unit P1" is, for example, disposed between the optical film F2 and the viewing angle control panel VCP'. For example, the first polarizing unit P1" may include a polarizer, such as an absorptive polarizer or a reflective polarizer, but not limited thereto. The first absorption axis A1" of the first polarizing unit P1" may be perpendicular to a polarization direction of the illumination light L from the backlight BLU. For example, the polarization direction of the illumination light L from the backlight BLU may be parallel to the direction D1, and the first absorption axis A1" of the first polarizing unit P1" is parallel to the direction D2.

The viewing angle control panel VCP' is, for example, disposed between the first polarizing unit P1" and the second polarizing unit P2". For the relevant description of the viewing angle control panel VCP', please refer to the above and will not be repeated here.

The second polarizing unit P2" is, for example, disposed between the viewing angle control panel VCP' and the display panel DP. For example, the second polarizing unit P2" may include a polarizer, such as an absorptive polarizer or a reflective polarizer, but not limited thereto. The second absorption axis A2" of the second polarizing unit P2" may be, for example, parallel to the direction D2.

The display panel DP is, for example, disposed between the second polarizing unit P2" and the third polarizing unit P3". For the relevant description of the display panel DP, please refer to the above and will not be repeated here.

The third polarizing unit P3" is, for example, disposed on the display panel DP. For example, the third polarizing unit P3" may include a polarizer or a dye liquid crystal panel. The polarizer includes, for example, an absorptive polarizer or a reflective polarizer, but not limited thereto. For the relevant description of the dye liquid crystal panel, please refer to the above and will not be repeated here. The third absorption axis A3" of the third polarizing unit P3" may be, for example, parallel to the direction D1.

According to different requirements, the display device 1D may further include other elements or film layers. For example, the display device 1D may further include a dye liquid crystal panel DC. The dye liquid crystal panel DC is, for example, disposed between the first polarizing unit P1" and the backlight BLU. For the relevant description of the dye liquid crystal panel DC, please refer to the above and will not be repeated here.

Table 4 shows the polarization state of light after passing through each film layer in the general display mode and the privacy mode of the display device 1D.

TABLE 4

| | General display mode "Front view" | General display mode "Side view" | Privacy mode "Front view" | Privacy mode "Side view" |
|---|---|---|---|---|
| BLU | ↔ | ↔ | ↔ | ↔ |
| DC | ↔ | ↔ | ↔ | ● |
| P1" | ↔ | ↔ | ↔ | |
| VCP' | ↔ | ↔ | ↔ | |
| P2" | ↔ | ↔ | ↔ | |
| DP | ⊙ | ⊙ | ⊙ | |
| P3" | ⊙ | ⊙ | ⊙ | |

It can be seen from Table 4 that the polarization direction of the light emitted from the backlight BLU is parallel to the direction D1. In some embodiments, the long axis direction of liquid crystal (including the dye liquid crystal DLC, see FIG. 4A) in the dye liquid crystal panel DC may be parallel to the direction D2 in the general display mode and may be parallel to the direction D3 in the privacy mode. In this way, in the general display mode, whether viewed from the front viewing angle or the side viewing angle, the polarization direction (parallel to the direction D1) of the light is perpendicular to the long axis direction of the liquid crystal (including the dye liquid crystal DLC, see FIG. 4A) in the dye liquid crystal panel DC, so that the light can pass through the dye liquid crystal panel DC, and after the light passes through the dye liquid crystal panel DC, the polarization direction of the light remains parallel to the direction D1. On the other hand, in the privacy mode, when viewed from the front viewing angle, the polarization direction (parallel to the direction D1) of the light is perpendicular to the long axis direction AX (refer to FIG. 4B) of the liquid crystal (including the dye liquid crystal DLC, see FIG. 4B) in the dye liquid crystal panel DC, so the light can pass through the dye liquid crystal panel DC, and after the light passes through the dye liquid crystal panel DC, the polarization direction of the light remains parallel to the direction D1. On the other hand, in the privacy mode, when viewed from the side viewing angle, the polarization direction (parallel to the direction D1) of the light is close to parallel to the long axis direction AX of the liquid crystal (including the dye liquid crystal DLC, see FIG. 4B) in the dye liquid crystal panel DC, so the light is blocked by the dye liquid crystal panel DC under the side view.

Since a transmission axis (perpendicular to the first absorption axis A1") of the first polarizing unit P1" is parallel to the direction D1, the light can pass through the first polarizing unit P1", and after the light passes through the first polarizing unit P1", the polarization direction of the light remains parallel to the direction D1. In the general display mode/privacy mode, the viewing angle control panel VCP' allows the light to pass through. Since a transmission axis of the second polarizing unit P2" is parallel to the direction D1, the light can pass through the second polarizing unit P2", and after the light passes through the second polarizing unit P2", the polarization direction of the light remains parallel to the direction D1.

In both the general display mode and the privacy mode, the display panel DP rotates the polarization direction of the light by 90 degrees, so after the light passes through the display panel DP, the polarization direction of the light becomes parallel to the direction D2. Since a transmission axis of the third polarizing unit P3" is parallel to the direction D2, the light can pass through the third polarizing unit P3", and after the light passes through the third polarizing unit P3", the polarization direction of the light remains parallel to the direction D2.

According to different requirements, the display device 1D may further include other elements or film layers. For example, although not shown, the display device 1D may further include a circular polarizer, and the circular polarizer may be disposed on the third polarizing unit P3" (refer to the circular polarizer CP of FIG. 2). In addition, in the display device 1D, the third polarizing unit P3" may replace the polarizer with the dye liquid crystal panel (refer to the dye liquid crystal panel DC of FIG. 3). Under the architecture of the third polarizing unit P3" adopting the dye liquid crystal panel, the dye liquid crystal panel may adopt the architecture of FIG. 5 to implement the divisional privacy function. In addition, the viewing angle control panel VCP' may adopt the architecture of FIG. 6 or FIG. 7 to implement the divisional privacy function.

Please refer to FIG. 10. A display device 1E is, for example, a privacy display device. Specifically, the display device 1E includes a backlight BLU, a display panel DP, a first polarizing unit P1"', a second polarizing unit P2"', and a third polarizing unit P3"', and the first polarizing unit P1"', the second polarizing unit P2"', the display panel DP, and the third polarizing unit P3''' are, for example, sequentially disposed on the backlight BLU. The backlight BLU is configured to provide an illumination light L. The display panel DP is disposed on a transmission path of the illumination light L to convert the illumination light L into a display light L'. The first polarizing unit P1''' is disposed between the backlight BLU and the second polarizing unit P2''' and has a first absorption axis A1'''. The second polarizing unit P2''' is disposed between the first polarizing unit P1'''' and the display panel DP and has a second absorption axis A2'''. The third polarizing unit P3''' is disposed on the display panel DP and has a third absorption axis A2'''. The third absorption axis A3''' and the second absorption axis A2''' are perpendicular to each other on the same plane (such as a plane formed by a direction D1 and a direction D2), and the first absorption axis A1''' is perpendicular to the second absorption axis A2'' and the third absorption axis A3''.

For the relevant description of the backlight BLU, please refer to the above and will not be repeated here. In some embodiments, an optical film F1 and an optical film F2 are respectively, for example, a brightness enhancement film and a dual brightness enhancement film, but not limited thereto.

The first polarizing unit P1'''' may include a polarizer, such as an absorptive polarizer or a reflective polarizer, but not limited thereto. The first absorption axis A1''' of the first polarizing unit P1'''' may be perpendicular to a polarization direction of the illumination light L from the backlight BLU. For example, the polarization direction of the illumination light L from the backlight BLU may be parallel to the direction D1, and the first absorption axis A1'' of the first polarizing unit P1'' is parallel to the direction D3.

The second polarizing unit P2'''' may include a polarizer, such as an absorptive polarizer or a reflective polarizer, but not limited thereto. The second absorption axis A2'''' of the second polarizing unit P2'''' may be, for example, parallel to the direction D2.

The display panel DP is, for example, disposed between the second polarizing unit P2''' and the third polarizing unit P3'''. For the relevant description of the display panel DP, please refer to the above and will not be repeated here.

The third polarizing unit P3'''' may include a polarizer or a dye liquid crystal panel. The polarizer includes, for example, an absorptive polarizer or a reflective polarizer, but not limited thereto. For the relevant description of the dye liquid crystal panel, please refer to the above and will not be repeated here. The third absorption axis A3'''' of the third polarizing unit P3'''' may be, for example, parallel to the direction D1.

Table 5 shows the polarization state of light after passing through each film layer.

TABLE 5

| | "Front view" | "Side view" |
|---|---|---|
| BLU | ↔ | ↔ |
| P1''' | ↔ | ● |
| P2''' | ↔ | |
| DP | ⊙ | |
| P3''' | ⊙ | |

As can be seen from Table 5, the polarization direction of the light emitted from the backlight BLU is parallel to the direction D1. When viewed from the front viewing angle, the polarization direction (parallel to the direction D1) of the light is perpendicular to the first absorption axis A1''' of the first polarizing unit P1''', so the light can pass through the first polarizing unit P1''', and after the light passes through the first polarizing unit P1''', the polarization direction of the light remains parallel to the direction D1. On the other hand, when viewed from the side viewing angle, the polarization direction (parallel to the direction D1) of the light is close to parallel to the first absorption axis A1''' of the first polarizing unit P1''', so the light is blocked by the first polarizing unit P1''' under the side view.

In summary, in the embodiments of the disclosure, issues such as light leakage or color cast at the large viewing angle can be improved through the configurations of the viewing angle control panel and/or the polarizing unit, thereby improving the display quality of the display device in the privacy mode.

The above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

Although the embodiments and the advantages of the disclosure have been disclosed above, it should be understood that any person skilled in the art may make changes, substitutions, and modifications without departing from the spirit and scope of the disclosure, and the features of the embodiments may be arbitrarily mixed and replaced to form other new embodiments. In addition, the protection scope of the disclosure is not limited to the process, machine, manufacture, material composition, device, method, and steps in the specific embodiments described in the specification. Any person skilled in the art may understand conventional or future-developed processes, machines, manufactures, material compositions, devices, methods, and steps from the content of the disclosure as long as the same may implement substantially the same functions or obtain substantially the same results as the embodiments described herein when used according to the disclosure. Therefore, the protection scope of the disclosure includes the above processes, machines, manufactures, material compositions, devices, methods, and steps. In addition, each claim constitutes a separate embodiment, and the protection scope of the disclosure further includes combinations of the claims and the embodiments. The protection scope of the disclosure should be defined by the appended claims.

What is claimed is:

1. A display device, comprising:

a backlight, configured to provide an illumination light;

a display panel, disposed on a transmission path of the illumination light to convert the illumination light into a display light;

a viewing angle control panel, configured to control a light emission angle of the display device;

a first polarizing unit, disposed between the backlight and the display panel and having a first absorption axis;

a second polarizing unit, disposed between the display panel and the viewing angle control panel and having a second absorption axis; and a third polarizing unit, disposed on the viewing angle control panel and having a third absorption axis, wherein the third absorption axis is perpendicular to the first absorption axis and the second absorption axis, and the first absorption axis and the second absorption axis are perpendicular to each other on a same plane;

wherein the first absorption axis and the second absorption axis are not parallel to each other, the first absorption axis and the third absorption axis are not parallel to each other, and the second absorption axis and the third absorption axis are not parallel to each other.

2. The display device according to claim 1, further comprising:

a circular polarizer, disposed on the third polarizing unit.

3. The display device according to claim 1, wherein the third polarizing unit comprises a polarizer or a dye liquid crystal panel.

4. The display device according to claim 3, wherein the viewing angle control panel or the dye liquid crystal panel comprises:

a first light transmitting electrode, disposed in a first region;

a second light transmitting electrode, disposed in a second region, wherein the first light transmitting electrode and the second light transmitting electrode belong to a same layer and are separated from each other; and a third light transmitting electrode, disposed in the first region and the second region and located on one side of the first light transmitting electrode and the second light transmitting electrode.

5. The display device according to claim 1, wherein the viewing angle control panel comprises:

a first light transmitting electrode, disposed in a first region and a second region;

a second light transmitting electrode, disposed in the first region and above the first light transmitting electrode; and a third light transmitting electrode, disposed in the first region and the second region and above the second light transmitting electrode.

6. A display device, comprising:

a backlight, configured to provide an illumination light;

a display panel, disposed on a transmission path of the illumination light to convert the illumination light into a display light;

a viewing angle control panel, configured to control a light emission angle of the display device;

a first polarizing unit, disposed between the backlight and the display panel and having a first absorption axis;

a second polarizing unit, disposed between the display panel and the viewing angle control panel and having a second absorption axis; and a third polarizing unit, disposed on the display panel and having a third absorption axis, wherein the third absorption axis and the second absorption axis are perpendicular to each other on a same plane, and the first absorption axis is perpendicular to the second absorption axis and the third absorption axis;

wherein the first absorption axis and the second absorption axis are not parallel to each other, the first absorption axis and the third absorption axis are not parallel to each other, and the second absorption axis and the third absorption axis are not parallel to each other.

7. The display device according to claim 6, wherein the first polarizing unit, the viewing angle control panel, the second polarizing unit, the display panel, and the third polarizing unit are sequentially disposed on the backlight.

8. The display device according to claim 7, further comprising:

a circular polarizer, disposed on the third polarizing unit.

9. The display device according to claim 7, wherein the third polarizing unit comprises a polarizer or a dye liquid crystal panel.

10. The display device according to claim 7, further comprising:

another viewing angle control panel, disposed between the viewing angle control panel and the second polarizing unit.

11. The display device according to claim 10, wherein the viewing angle control panel comprises a first liquid crystal, the another viewing angle control panel comprises a second liquid crystal, and the second liquid crystal is different from the first liquid crystal.

12. The display device according to claim 11, wherein a light emission angle range controlled by the first liquid crystal is different from a light emission angle range controlled by the second liquid crystal.

13. The display device according to claim 9, wherein the viewing angle control panel or the dye liquid crystal panel comprises:

a first light transmitting electrode, disposed in a first region;

a second light transmitting electrode, disposed in a second region, wherein the first light transmitting electrode and the second light transmitting electrode belong to a same layer and are separated from each other; and a third light transmitting electrode, disposed in the first region and the second region and located on one side of the first light transmitting electrode and the second light transmitting electrode.

14. The display device according to claim 6, wherein the viewing angle control panel comprises:

a first light transmitting electrode, disposed in a first region and a second region;

a second light transmitting electrode, disposed in the first region and above the first light transmitting electrode; and a third light transmitting electrode, disposed in the first region and the second region and above the second light transmitting electrode.

* * * * *